United States Patent
Kim et al.

(10) Patent No.: US 9,588,570 B2
(45) Date of Patent: Mar. 7, 2017

(54) APPARATUS AND METHOD FOR ADJUSTING BANDWIDTH

(71) Applicants: Samsung Electronics Co., Ltd., Suwon-si (KR); Wisconsin Alumni Research Foundation, Madison, WI (US)

(72) Inventors: Ho-Young Kim, Seoul (KR); Nam-Sung Kim, Middleton, WI (US); Daniel W. Chang, Madison, WI (US)

(73) Assignees: Samsung Electronics Co., Ltd., Suwon-si (KR); Wisconsin Alumni Research Foundation, Madison, WI (US)

( * ) Notice: Subject to any disclaimer, the term of this patent is extended or adjusted under 35 U.S.C. 154(b) by 290 days.

(21) Appl. No.: 14/263,309

(22) Filed: Apr. 28, 2014

(65) Prior Publication Data

US 2014/0325248 A1 Oct. 30, 2014

Related U.S. Application Data

(60) Provisional application No. 61/817,420, filed on Apr. 30, 2013.

(30) Foreign Application Priority Data

Nov. 7, 2013 (KR) .......................... 10-2013-0134908

(51) Int. Cl.
*G06F 1/32* (2006.01)
*G06F 13/42* (2006.01)

(52) U.S. Cl.
CPC ........ *G06F 1/3234* (2013.01); *G06F 13/4234* (2013.01); *Y02B 60/1228* (2013.01); *Y02B 60/1235* (2013.01)

(58) Field of Classification Search
None
See application file for complete search history.

(56) References Cited

U.S. PATENT DOCUMENTS

| | | | |
|---|---|---|---|
| 2005/0182885 A1 | 8/2005 | Matsui et al. | |
| 2005/0283339 A1* | 12/2005 | Homma | G06F 11/3409 702/182 |
| 2007/0091922 A1 | 4/2007 | Elliot et al. | |
| 2008/0002585 A1 | 1/2008 | Safranek et al. | |
| 2008/0259803 A1 | 10/2008 | Elliot et al. | |
| 2010/0080132 A1 | 4/2010 | Srinivasan et al. | |

(Continued)

FOREIGN PATENT DOCUMENTS

| | | |
|---|---|---|
| JP | 2007-116714 A | 5/2007 |
| KR | 10-2010-0081272 A | 7/2010 |

(Continued)

OTHER PUBLICATIONS

Extended European Search Report issued Jul. 27, 2015 in counterpart European Application No. EP 14166449.0 (5 pages).

*Primary Examiner* — Ernest Unelus
*Assistant Examiner* — Dayton Lewis-Taylor
(74) *Attorney, Agent, or Firm* — NSIP Law

(57) ABSTRACT

A method for adjusting bandwidth, a bandwidth scaler and an apparatus are provided. The method for adjusting bandwidth involves determining a dynamic context of a processor, and based on the determined dynamic context, scaling bandwidth between the processor and a memory.

36 Claims, 10 Drawing Sheets

(56) References Cited

U.S. PATENT DOCUMENTS

| | | |
|---|---|---|
| 2010/0174858 A1 | 7/2010 | Chen et al. |
| 2010/0274953 A1 | 10/2010 | Lee et al. |
| 2011/0113269 A1 | 5/2011 | Park |
| 2012/0173907 A1 | 7/2012 | Moses et al. |
| 2012/0233477 A1* | 9/2012 | Wu ................... G06F 1/3287 713/320 |

FOREIGN PATENT DOCUMENTS

| | | |
|---|---|---|
| KR | 10-2010-0116934 A | 11/2010 |
| KR | 10-2011-0050010 A | 5/2011 |

\* cited by examiner

APPARATUS AND METHOD FOR ADJUSTING BANDWIDTH

CROSS-REFERENCE TO RELATED APPLICATION(S)

This application claims the benefit under 35 USC 119(a) of Korean Patent Application No. 10-2013-0134908 filed on Nov. 7, 2013, in the Korean Intellectual Property Office, and U.S. Provisional Patent Application No. 61/817,420 filed on Apr. 30, 2013, in the U.S. Patent and Trademark Office, the entire disclosure of both of which is incorporated herein by reference for all purposes.

BACKGROUND

1. Field

The following description relates to an apparatus and a method for adjusting bandwidth, and to, for example, a computing apparatus, a bandwidth scaler, and a method for adjusting bandwidth, in which the bandwidth of an external memory is dynamically scaled by activating or deactivating one or more of a plurality of input and output terminals provided in an external memory, based on a dynamic context of a processor.

2. Description of Related Art

A computing apparatus may include one or more processors and one or more external memories from which data is retrieved or to which data is transmitted from the processors. In order to execute applications that require processing of large amounts of data, an external memory is needed in addition to the processor. For example, the execution of applications involving image processing, audio processing, processing of three-dimensional (3D) graphics and the like, may require data transmission to and from an external memory, such as an off-chip memory that is coupled to a processor.

However, an off-chip memory bandwidth capacity may be limited by various factors. If the provided off-chip memory bandwidth cannot sustain the rate at which data transmission are required by the application, the performance of the processor may decline based on the available bandwidth. Further, an increase in the bandwidth of the external memory used by such a computing apparatus results in an increased input and output memory power, and results in an increased power consumption by the computing apparatus.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for adjusting bandwidth involves collecting information that corresponds to a dynamic context of a processor, determining the dynamic context of the processor based on the collected information, and dynamically scaling bandwidth by activating or deactivating at least one terminal among a plurality of input and output terminals based on the determined dynamic context.

The dynamic scaling of the bandwidth may involve, in response to a determination to expand the bandwidth according to the dynamic context, activating at least one deactivated terminal among the plurality of input and output terminals.

The dynamic scaling of the bandwidth may involve, in response to a determination to reduce the bandwidth according to the dynamic context, deactivating at least one activated terminal among the plurality of input and output terminals.

The collected information may be a cache miss rate.

The dynamic scaling of the bandwidth may involve comparing collected cache miss rates to a predetermined threshold, and determining to expand the bandwidth in response to the collected cache miss rates being greater than the predetermined threshold.

The dynamic scaling of the bandwidth may involve comparing collected cache miss rates to a predetermined threshold, and determining to reduce the bandwidth in response to the collected cache miss rates being smaller than the predetermined threshold.

The collected information may be a number of instructions per cycle processed by the processor.

The dynamic scaling of the bandwidth may involve comparing collected instructions per cycle to a predetermined threshold, and determining to expand the bandwidth in response to a number of the collected instructions per cycle being smaller than the predetermined threshold.

The dynamic scaling of the bandwidth may involve comparing collected instructions per cycle to a predetermined threshold, and determining to reduce the bandwidth in response to a number of the collected instructions per cycle being greater than the predetermined threshold.

The general aspect of the method may further involve, after dynamically scaling the bandwidth, in response to the dynamic context of the processor not being responsive to the scaled bandwidth, returning the scaled bandwidth to a default bandwidth.

The returning may involve determining the responsiveness of the dynamic context based on information corresponding to the dynamic context of the processor collected after the bandwidth is scaled.

The general aspect of the method may further involve, after dynamically scaling the bandwidth to reach a maximum level and determining that no improvement resulted in the dynamic context from the dynamical scaling, returning the scaled bandwidth to a default bandwidth.

In another general aspect, a bandwidth scaler includes an information collector configured to collect information that corresponds to a dynamic context of a processor, and a port switch configured to dynamically scale bandwidth by determining the dynamic context of the processor based on the collected information, by activating or deactivating at least one terminal among a plurality of input and output terminals.

In response to a determination to expand the bandwidth according to the dynamic context, the port switch may be configured to activate at least one deactivated terminal among the plurality of input and output terminals.

In response to a determination to reduce the bandwidth according to the dynamic context, the port switch may be configured to deactivate at least one activated terminal among the plurality of input and output terminals.

The collected information may be a cache miss rate.

After comparing collected cache miss rates to a predetermined threshold, the port switch may determine to expand the bandwidth in response to the collected cache miss rates being greater than the predetermined threshold.

After comparing collected cache miss rates to a predetermined threshold, the port switch may determine to reduce the bandwidth in response to the collected cache miss rates being smaller than the predetermined threshold.

The collected information may be a number of instructions per cycle processed by the processor.

After comparing collected instructions per cycle to a predetermined threshold, the port switch may determine to expand the bandwidth in response to a number of the collected instructions per cycle being smaller than the predetermined threshold.

After comparing collected instructions per cycle to a predetermined threshold, the port switch may determine to reduce the bandwidth in response to a number of the collected instructions per cycle being greater than the predetermined threshold.

The general aspect of the scaler may further include a bandwidth returner configured to, after the bandwidth is dynamically scaled, return the scaled bandwidth to a default bandwidth in response to the dynamic context of the processor being not responsive to the scaled bandwidth.

The bandwidth returner may be configured to determine the responsiveness of the dynamic context based on information corresponding to the dynamic context of the processor collected after the bandwidth is scaled.

After dynamically scaling the bandwidth to reach a maximum level and determining that no improvement resulted in the dynamic context from the dynamic scaling, the bandwidth returner may be configured to return the scaled bandwidth to a default bandwidth.

In another general aspect, a method for adjusting bandwidth involves determining a dynamic context of a processor, and based on the dynamic context, scaling bandwidth between the processor and a memory without changing voltage or frequency.

The scaling may involve, to expand the bandwidth based on the dynamic context, activating at least one deactivated terminal among a plurality of input and output terminals.

The scaling may involve, to reduce the bandwidth based on the dynamic context, deactivating at least one activated terminal among a plurality of input and output terminals.

The dynamic context may be determined based on a cache miss rate.

The dynamic context may be determined based on a number of instructions per cycle processed by the processor.

The general aspect of the method may further involve, after scaling the bandwidth, in response to the dynamic context of the processor being not responsive to the scaled bandwidth, returning the scaled bandwidth to a default bandwidth.

The returning may involve determining the responsiveness of the dynamic context based on the dynamic context determined after the bandwidth is scaled.

In another general aspect, an apparatus includes a port switch configured to dynamically scale bandwidth between a processor and a memory by activating or deactivating at least one terminal among a plurality of input and output terminals, based on a dynamic context of a processor.

The general aspect of the apparatus may further include an information collector configured to collect information used to determine the dynamic context of the processor.

The general aspect of the apparatus may further include a bandwidth returner configured to return the scaled bandwidth to a default bandwidth in response to a determination that the dynamic context is not responsive to the scaling of the bandwidth by the port switch.

The general aspect of the apparatus may further include the processor and the memory, wherein the memory is an off-chip memory.

The information collector may be configured to collect at least one of a cache miss rate or a number of instructions per cycle processed by the processor as the information used to determine the dynamic context of the processor.

Other features and aspects will be apparent from the following detailed description, the drawings, and the claims.

Figure 1:
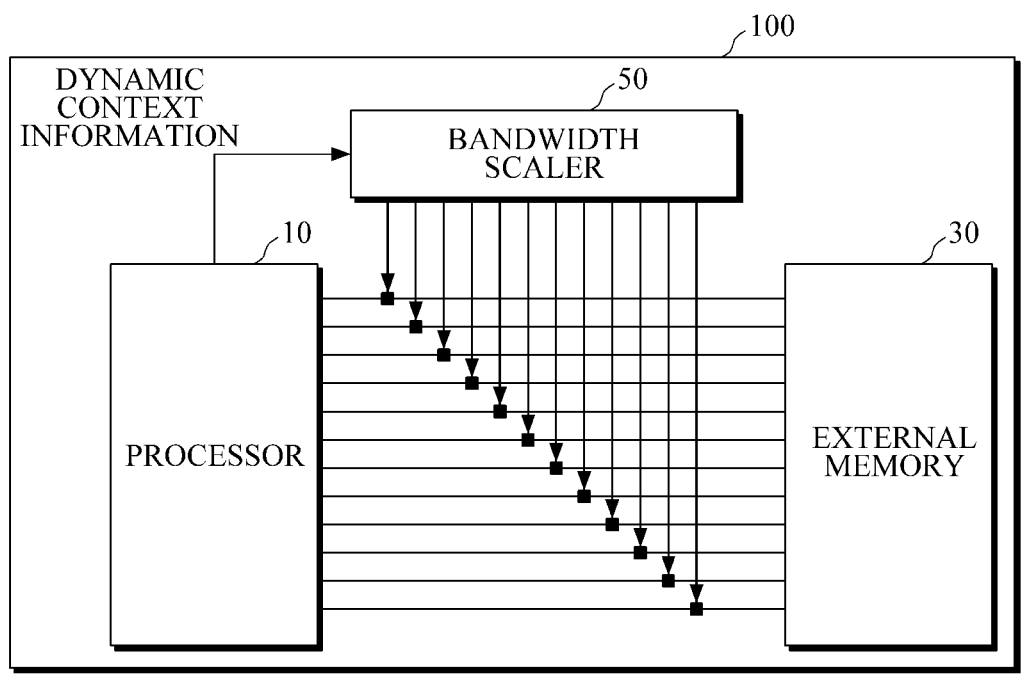
FIG. 1 is a diagram illustrating an example of a computing apparatus that includes a processor, an external memory, and a bandwidth scaler.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, a computing apparatus, a method for adjusting memory bandwidth thereof, and a bandwidth scaler will be described in detail with reference to the accompanying drawings.

FIG. 1 is a diagram illustrating an example of a computing apparatus that includes a processor, an external memory, and a bandwidth scaler.

Referring to FIG. 1, the computing apparatus 100 includes a processor 10, an external memory 30, and a bandwidth scaler 50.

The computing apparatus 100 may be an apparatus for executing applications that require processing of large amounts of data, such as image processing, audio processing, or processing of three-dimensional graphics. For example, the computing apparatus 100 may be one of a video signal processing apparatus, an audio signal processing apparatus, or a high-speed computer. Alternatively, the computing apparatus 100 may be implemented as a System on Chip (SoC) that includes the processor 10, the external memory 30, and the bandwidth scaler 50. The bandwidth scaler 50 is a memory bandwidth scaler that scales the bandwidth of an external memory.

The processor 10 supports access to the external memory 30, and may process data transmitted from the external memory 30. The processor 10 may be a processor for processing large amounts of data, such as image processing, audio processing, or processing of three-dimensional graphics. For example, the processor 10 may be any one of a central processing unit (CPU), a graphic processing unit (GPU), or a digital signal processor (DSP). The processor 10 may provide information about internal events to the outside by various methods. For example, the processor 10 may provide event information to the outside by adjusting a specific register value at a point where a specific event occurs. Event information provided by such processor may be used as dynamic context information.

The external memory 30 is an off-chip memory. The external memory 30 may store various programs and data required for operation of the computing apparatus 100. In this example, the external memory 30 includes a plurality of input and output terminals for data transmission to and from the processor 10. The input and output terminal refers to an input and output port, an input and output pin, and the like, that are used for data transmission. According to an example, the external memory 30 may be capable of data transmission to the processor 10 only while an input and output terminal is activated. The external memory 30 may be a memory device that has a high memory bandwidth to effectively support the processor 10. For example, the external memory 30 may be a 3D stacking DRAM.

The bandwidth scaler 50 dynamically scales the bandwidth of the external memory 30 by activating or deactivating each of a plurality of input and output terminals of the external memory 30 according to a dynamic context of the processor 10, without any need for adjusting the voltage or bandwidth of a processor. The bandwidth scaler 50 will be described in detail with reference to FIGS. 5 and 6.

The computing apparatus 100 performs fine scaling by adjusting bandwidth of the external memory 30 at an input and output terminal. The computing apparatus 100 may further dynamically adjust the bandwidth of the external memory 30 according to the memory bandwidth requirements for application workloads. By dynamically adjusting the bandwidth, it is possible to reduce leakage energy that is consumed by an external memory having a high bandwidth. Thus, the power consumption involved in executing an application on the computing apparatus 100 may be reduced by using the dynamical scaling method.

Figure 2:
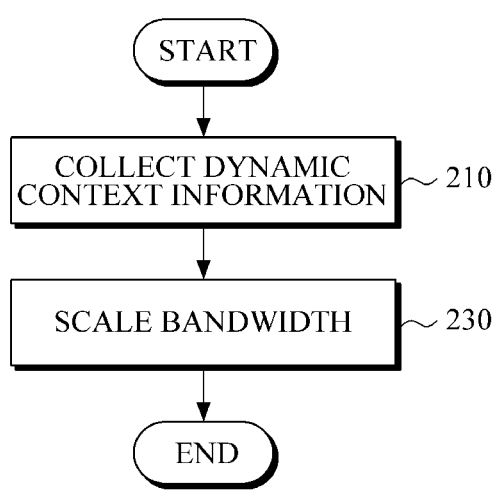
FIG. 2 is a flowchart illustrating an example of a method for adjusting memory bandwidth of a computing apparatus.

FIG. 2 is a flowchart illustrating an example of a method for adjusting memory bandwidth of a computing apparatus. Referring to FIG. 2, the method for adjusting memory bandwidth of a computing apparatus includes collecting dynamic context information in 210, and scaling bandwidth in 230.

The collecting of dynamic context information in 210 involves collecting information that represents or corresponds to the operations or states of the processor 10. The operations or states of the processor 10 may be referred to as a dynamic context of the processor 10. For example, the dynamic context information may include information regarding a specific event that is occurring within the processor 10, or information regarding a specific event that is being processed by the processor 10. Information about a specific event is provided for the scaling by the processor 10. In another example, the dynamic context information may include information about cache miss rates of the processor 10. In another example, the dynamic context information may include information regarding buffer memory access by the processor 10.

According to an example, the collecting of dynamic context information in 210 may involve collecting dynamic context information by reading a value stored in a specific register of the processor 10. According to another example, the collecting of dynamic context information in 210 may involve collecting dynamic context information by a basic input and output system (BIOS), or by a preinstalled device in an operating system (OS). According to still another example, the collecting of dynamic context information in 210 may involve receiving dynamic context information from a separately provided device.

The scaling of bandwidth in 230 may involve scaling the bandwidth of the external memory 30 by activating or deactivating at least one terminal among a plurality of input and output terminals provided in the external memory 30. The activation of an input and output terminal may refer to the switching on of the input and output terminal, and the deactivation of an input and output terminal may refer to the switching off of the input and output terminal. The input and output terminals may be referred to as input and output ports, or simply referred to as ports.

In the example illustrated in FIG. 2, based on an analysis of collected dynamic context information, a determination may be made as to whether a wider bandwidth or a narrower bandwidth is required for data transmission. In response to a determination that a wider bandwidth is required, by activating at least one deactivated input and output terminal among a plurality of input and output terminals, the bandwidth is expanded by a magnitude that corresponds to the bandwidth contributed by the newly activated one or more input and output terminal. On the contrary, the analysis of collected dynamic context information may result in a determination that a narrower bandwidth is sufficient for data transmission between the processor and the external memory. In response to such a determination, by deactivating at least one activated input and output terminal among a plurality of input and output terminals provided in the external memory, the bandwidth is reduced by a magnitude that corresponds to the newly deactivated one or more input and output terminal.

For bandwidth scaling, there is also a method for adjusting only the frequency, or adjusting the voltage along with the frequency. However, in a circuit that is driven at a low voltage, a voltage swing width is narrow, such that a bandwidth scaling range is small, making a precise scaling of bandwidth difficult. Accordingly, in a method for adjusting bandwidth by variably changing only frequency, or by changing voltage along with frequency, the number of stages of bandwidth scaling is generally limited to a few.

By contrast, according to the method for adjusting bandwidth illustrated in FIG. 2, by opening and closing a plurality of input and output terminals in a pin unit, the expansion and reduction of bandwidth may be scaled with excellent precision. For example, in the existing 3D stacking DRAM that includes a plurality of input and output terminals, the number of stages of bandwidth between minimum bandwidth and maximum bandwidth amounts to thousands. Further, according to the example illustrated in FIG. 2, a method for adjusting bandwidth by opening and closing a plurality of input and output terminals in a pin unit may be implemented via a logic circuit, which is simple in that a preinstalled tri-state pin may be used in comparison to a method that adjust bandwidth by adjusting voltage.

Figure 3A:
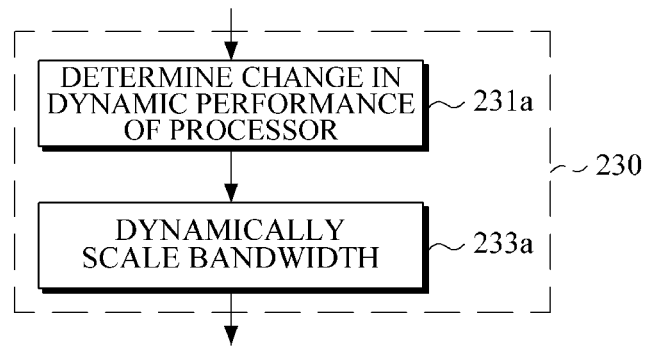
FIGS. 3A to 3D are flowcharts illustrating examples of scaling operations that may be used in the method for adjusting memory bandwidth illustrated in FIG. 2.

FIG. 3A is a flowchart that illustrates an example of a scaling operation 230 according to the method for adjusting memory bandwidth described with reference to FIG. 2.

Referring to FIG. 3A, the scaling operation 230 may involve determining in 231a changes in dynamic performance of the processor 10 based on collected dynamic context information. Further, the scaling operation 230 may involve scaling bandwidth of the external memory 30 in 233a by activating or deactivating each of a plurality of input and output terminals provided in the external memory 30 based on the determination made in 231a.

Based on an analysis of collected dynamic context information in 231a, it may be determined that a wider bandwidth is required according to changes in dynamic performance of the processor 10. In such an event, a dynamic scaling of the bandwidth may be performed in 233a, by activating at least a part of deactivated input and output terminals among a plurality of input and output terminals. By activating one or more deactivated input and out terminals, the bandwidth is expanded by a magnitude corresponding to the additional bandwidth contributed by the newly activated input and output terminals. Bandwidth expansion improves a data transmission bottleneck effect that occurs at an input and output terminal, and results in enhancing the overall processing performance.

Similarly, based on an analysis of collected dynamic context information in 231a, it may be determined that a narrower bandwidth is sufficient for data transmission based on the dynamic performance of the processor 10. In such an event, a dynamic scaling of bandwidth may be performed in 233a, by deactivating at least one activated input and output terminal among a plurality of input and output terminals. The bandwidth is reduced by a magnitude that was contributed by the newly deactivated input and output terminal before the deactivation. Bandwidth reduction lowers the power consumption involved in data transmission at the input and output terminals, thereby resulting in an enhancement of the overall processing performance.

Figure 3B:
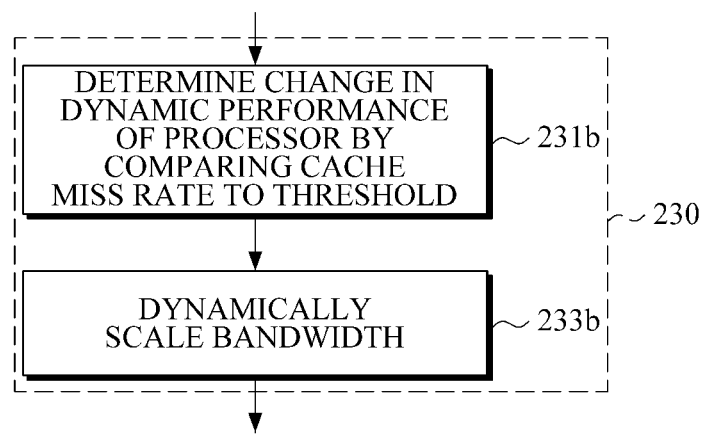

FIG. 3B is a flowchart that illustrates another example of a scaling operation 230 in a method for adjusting a memory bandwidth described in reference to FIG. 2.

Referring to FIG. 3B, the scaling operation 230 may involve comparing collected cache miss rates to a predetermined threshold to detect changes in dynamic performance of the processor 10 in 231b, which are caused by an increased data waiting time due to the external memory 30. Further, the scaling operation 230 may involve scaling bandwidth of the external memory 30 in 233a by activating or deactivating each of a plurality of input and output terminals provided in the external memory 30 based on the determination. Based on the result of a comparison of collected cache miss rates to a threshold in 231b, it may be determined that a wider bandwidth is required for efficient data transmission according to the dynamic performance of the processor 10. In such an event, the bandwidth is dynamically scaled by activating at least a part of deactivated input and output terminals among a plurality of input and output terminals in 233b. The bandwidth is expanded by a magnitude that corresponds to the contribution by the newly activated one or more input and output terminal. Bandwidth expansion alleviates a data transmission bottleneck effect that occurs at an input and output terminal, and thus results in the enhancement of the overall processing performance.

For example, the detection of a greater cache miss rate than a threshold indicates that the data waiting time has increased due to insufficient bandwidth to transmit data to and from the external memory 30. The increase in data waiting time leads to a reduction in dynamic performance. Accordingly, in the event that a cache miss rate is greater than a threshold, it is determined that the dynamic performance of the processor 10 has decreased. Thus, by newly activating at least a part of deactivated input and output terminals, the bandwidth may be increased by a magnitude contributed by the newly activated input and output terminals.

In another example, the scaling operation 230 may involve comparing a certain number of cache miss rates recently collected in a consecutive manner to a predetermined threshold. In the event that a cache miss rate is greater than a threshold for a certain number of time intervals or more, it may be determined that dynamic performance of the processor 10 has decreased. For example, if three cache miss rates are greater than a threshold among five cache miss rates recently collected, it may be determined that dynamic performance of the processor 10 has decreased. By comparing a plurality of cache miss rates to a threshold to determine changes in dynamic performance, it is possible to detect changes in dynamic performance of the processor 10 more accurately than in an example in which a single cache miss rate is compared to a threshold.

Similarly, based on the result of comparing the collected cache miss rates to a threshold in 231b, it may be determined that a narrower bandwidth is sufficient for data transmission based on the dynamic performance of the processor 10. In respond to such a determination, in the scaling of bandwidth in 233b, by deactivating at least a part of activated input and output terminals among a plurality of input and output terminals, the bandwidth may be reduced by a magnitude that corresponds to the contribution of the newly deactivated input and output terminals. Bandwidth reduction lowers the power consumption by the input and output terminals, and thus results in an enhancement of the overall processing performance.

Figure 3C:
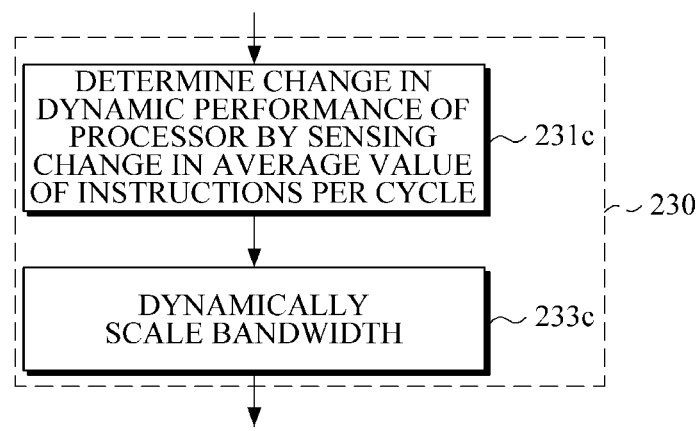

FIG. 3C is a flowchart illustrating another example of a scaling operation 230 in the method for adjusting memory bandwidth described with reference to FIG. 2.

Referring to FIG. 3C, the scaling operation 230 may involve calculating an average value of instructions per cycle collected in a certain section according to a predetermined standard, and sensing changes in the calculated average value, in order to determine changes in dynamic performance of the processor 10 according to changes in parallel operation performance of the processor 10. The scaling operation 230 may involve dynamically scaling the bandwidth of the external memory 30 in 233c by activating or deactivating one or more of a plurality of input and output terminals provided in the external memory 30 based on the changes in dynamic performance.

In operation 231c, changes in collected instructions per cycle (IPC) may indicate a reduction in the dynamic performance of the processor 10. Accordingly, it may be determined that a wider bandwidth is required for efficient data transmission. In response to a determination that a wider bandwidth is required, in the bandwidth is dynamically scaled by activating at least a part of deactivated input and output terminals among a plurality of input and output terminals in 233b, thereby expanding the bandwidth by a magnitude that corresponds to the contribution by the newly activated input and output terminals. Bandwidth expansion alleviates a data transmission bottleneck effect that is occurring at an input and output terminal, and results in an enhancement of the overall processing performance.

For example, based on collected instructions per cycle, an average value of instructions per cycle collected in a certain section is calculated according to a predetermined standard, and in response to sensing a reduction in the calculated average value of instructions per cycle, it may be determined that dynamic performance of the processor 10 has decreased in 231c. For example, in response to an average value of five instructions per cycle recently collected being smaller than a previous average value, it may be determined that dynamic performance of the processor 10 has decreased. In the alternative, in response to an average value of five instructions per cycle recently collected being smaller than a predetermined reference IPC value, it may be determined that dynamic performance of the processor 10 has decreased. In response to a determination that dynamic performance of the processor 10 is reduced, the bandwidth of the external memory 30 may be increased by further activating power of input and output terminals. The bandwidth may be dynamically scaled in 233c, by activating at least a part of deactivated input and output terminals among a plurality of input and output terminals, expanding the bandwidth by a magnitude that corresponds to the contribution of the newly activated input and output terminals. Bandwidth expansion alleviates a data transmission bottleneck effect that occurs at an input and output terminal, thereby enhancing the overall processing performance.

Similarly, based on an increased average value of instructions per cycle, it may be determined in 231c that dynamic performance of the processor 10 has improved. Based on the determination, and by considering the trade-off between power consumption and dynamic performance of the processor 10, it may be determined that a narrower bandwidth is sufficient. In such an event, the bandwidth may be scaled in 233c, by deactivating at least a part of activated input and output terminals among a plurality of input and output terminals. The bandwidth is reduced by a magnitude corresponding to the newly deactivated input and output terminals. Bandwidth reduction results in a lower power consumption in the input and output terminals, and results in an enhancement of the overall processing performance.

Figure 3D:
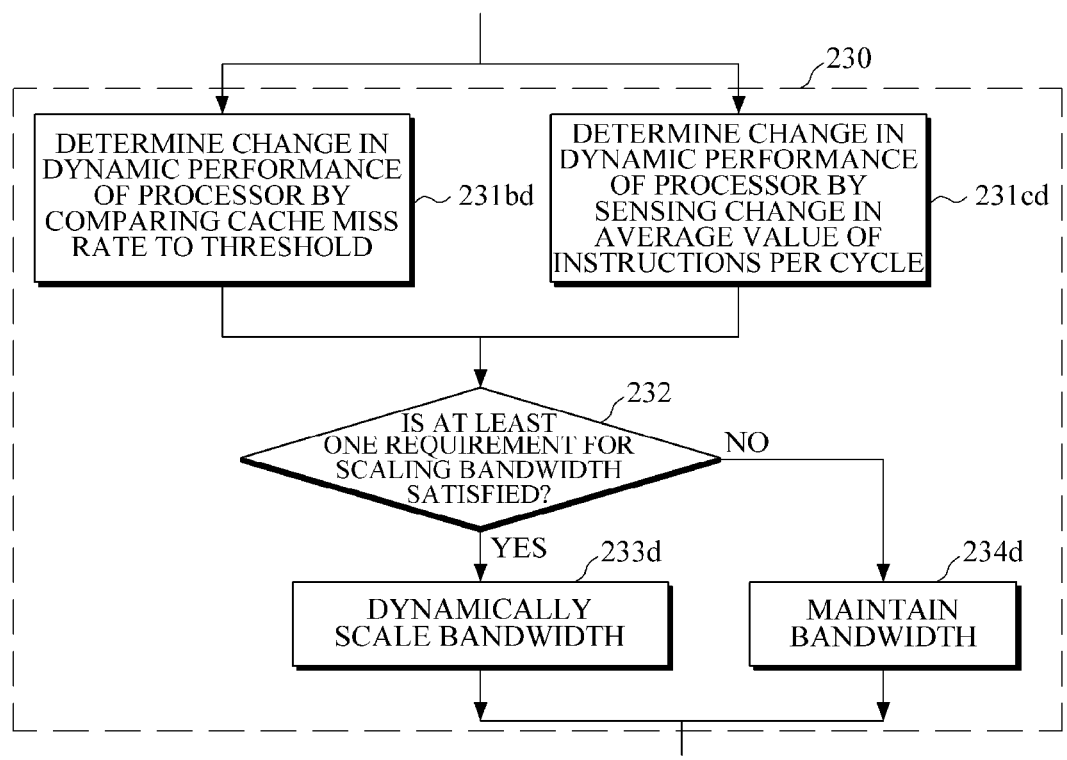

FIG. 3D is a flowchart illustrating yet another example of a scaling operation in the method for adjusting memory bandwidth illustrated in FIG. 2. The scaling operation 320 may involve determining changes in dynamic performance of the processor 10 based on information about two or more dynamic contexts collected, and dynamically scaling the bandwidth of the external memory 30 based on the determination. For example, in FIG. 3D, changes in dynamic performance of the processor 10 are determined based on information about two dynamic contexts: a cache miss rate, and instructions per cycle.

Referring to FIG. 3D, the scaling operation 230 may involve comparing the collected cache miss rates with a predetermined threshold to determine in 231bd the changes in the dynamic performance of the processor 10 caused by an increased data waiting time due to the external memory 30. In addition, based on the changes in instructions per cycle collected, the changes in dynamic performance of the processor 10 may be determined in 231cd.

Based on the determinations obtained in 231bd and 231cd, a choice is made in 232 as to whether to expand or to reduce the bandwidth, or as to whether it is not necessary to scale the bandwidth.

For example, in response to a determination to expand the bandwidth in 232, the bandwidth may be expanded by a magnitude that corresponds to newly activated input and output terminals by activating one or more deactivated input and output terminal among a plurality of input and output terminals to dynamically scale the bandwidth in 233d. Bandwidth expansion alleviates a bottleneck effect that occurs at an input and output terminal, and results in the enhancement of the overall processing performance.

Similarly, in response to a determination to reduce bandwidth in 232, the bandwidth may be reduced by a magnitude that corresponds to newly deactivated input and output terminals by deactivating one or more activated input and output terminals among a plurality of input and output terminals. Bandwidth reduction lowers the power consumption by the input and output terminals, and results in the enhancement of the overall processing performance.

Further, in response to a determination to maintain a current bandwidth in 232 without scaling the bandwidth, the current bandwidth is maintained in 234d without being expanded or reduced.

Figure 4:
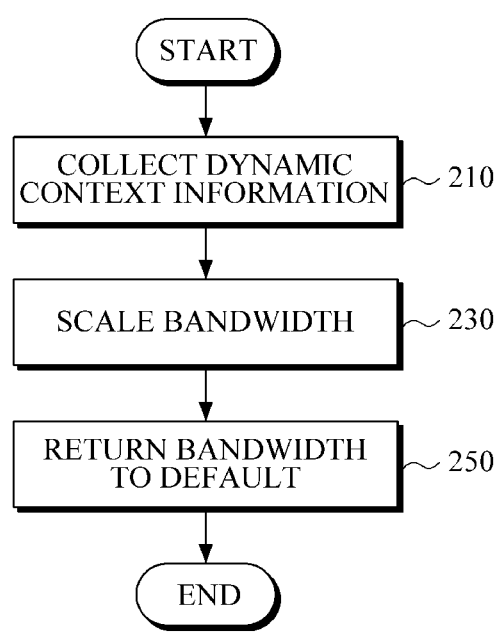
FIG. 4 is another flowchart illustrating an example of a method for adjusting memory bandwidth of a computing apparatus.

FIG. 4 is another flowchart illustrating an example of a method for adjusting memory bandwidth of a computing apparatus.

Referring to FIG. 4, the method for adjusting memory bandwidth of a computing apparatus involves: collecting dynamic context information in 210; scaling bandwidth in 230; and returning bandwidth to a default in 250. As the collecting of dynamic context information in 210 and the scaling of bandwidth in 230 are the same as operations described above with reference to FIGS. 2, and 3A to 3D, only the returning of bandwidth to default in 250 will be described in detail hereinafter.

In the event that the dynamic performance of a processor is not changed by the scaling of the bandwidth of an external memory, the bandwidth of the external memory may be returned to a default bandwidth in 250. In other words, in response to a determination that the change in memory bandwidth is not relevant to the dynamic performance of the processor 10, the bandwidth of the external memory 30 is returned to a default bandwidth. For example, due to a high cache miss rate detected based on the collected cache miss rates, the bandwidth may be scaled to reach a maximum level. In the event that the cache miss rates subsequently collected are still maintained to a level greater than a threshold, it is determined that the dynamic performance of the processor 10, which were determined based on cache miss rates collected, are not relevant to the memory bandwidth. Thus, the memory bandwidth of the external memory 30 may be returned to a default bandwidth. By returning expanded bandwidth to default bandwidth regardless of changes in dynamic performance of the processor 10, the power consumption caused by the expansion of the bandwidth may be reduced or eliminated, thereby improving the overall power efficiency.

In another example, based on collected instructions per cycle, a bandwidth of the external 30 may be scaled to reach a maximum level. In response, an average value of instructions per cycle subsequently calculated may be reduced continuously. In such an event, it is determined that the memory bandwidth is irrelevant to the changes in dynamic performance of the processor 10, which were determined based on the collected instructions per cycle, and the memory bandwidth of the external memory 30 may be returned to a default bandwidth.

The method for adjusting bandwidth according to an example may also be embodied as computer readable codes on a non-transitory computer readable recording medium. The computer readable recording medium is any data storage device that can store data which can be thereafter read by a computer system.

Figure 5:
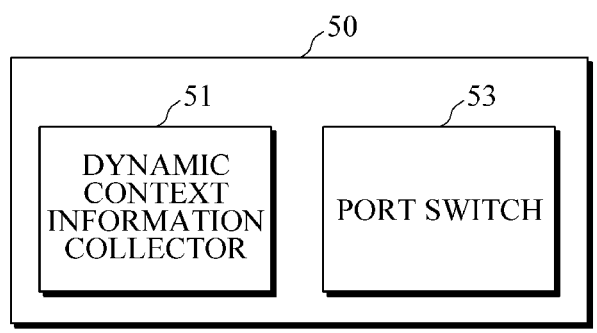
FIG. 5 is a diagram illustrating an example of a bandwidth scaler.

FIG. 5 is a diagram illustrating an example of a bandwidth scaler.

Referring to FIG. 5, the bandwidth scaler includes a dynamic context information collector 51 and a port switch 53.

The dynamic context information collector 51 collects information about at least one dynamic context that represents or corresponds to a dynamic context of the processor 10. The dynamic context information collector 51 may be a device preinstalled in a BIOS or an operating system, or a device separately provided for collecting dynamic context information. For example, the dynamic context information may be information about a specific event of a processor provided by the processor 10. In another example, the dynamic context information may be at least one of a cache miss rate or an instruction per cycle.

The port switch 53 may scale a bandwidth of the external memory 30 by activating or deactivating at least one terminal among a plurality of input and output terminals provided in the external memory 30 based on collected dynamic context information. The activation or deactivation may be performed for each of a plurality of input and output terminals. For example, by switching off an input and output terminal on a memory interface, the port switch 53 may deactivate the input and output terminal. Further, by switching on an input and output terminal, the port switch 53 may activate the input and output terminal.

In one example, the port switch 53 determines changes in dynamic performance of the processor 10 by comparing collected cache miss rates to a predetermined threshold. For example, a high cache miss rate leads to an increase in data waiting time. Thus, in response to the collected cache miss rate being above a predetermined threshold value, it may be determined that the dynamic performance of the processor 10 has decreased. Similarly, a low cache miss rate leads to a decrease in data waiting time. Thus, in response to the collected cache miss rate being below a predetermined threshold value, it may be determined that the dynamic performance of the processor 10 has improved. Based on the determination regarding the dynamic performance of the processor 10, the port switch 53 may scale the bandwidth of the external memory 30 by activating or deactivating each of a plurality of input and output terminals provided in the external memory 30.

In another example, the port switch 53 determines in advance changes in dynamic performance of the processor 10 based on an average value of instructions per cycle. For example, an average value of instructions per cycle collected in a certain section may be calculated according to a predetermined standard, and changes in the calculated average value may be determined. Further, the port switch 53 may scale bandwidth of the external memory 30 by activating or deactivating each of a plurality of input and output terminals provided in the external memory 30 based on the determination.

In another example, the port switch 53 may determine the changes in dynamic performance of the processor 10 based on information of two or more dynamic contexts that are collected, including, for example, the cache miss rates, instructions per cycle, and the like. Based on the determination, the port switch 53 may scale a bandwidth of the external memory 30.

As described above, the bandwidth scaler 50 may precisely scale the bandwidth of the external memory 30 by scaling the bandwidth of the external memory 30 at an input and output terminal. Further, by scaling the bandwidth of the external memory 30 in consideration of dynamic contexts of the processor 10, the bandwidth scaler 50 may dynamically scale the bandwidth of the external memory 30 according to memory bandwidth requirements for application workloads. As a result, the leakage energy consumed by the external memory 30 with a high bandwidth may be reduced, thereby reducing the power consumption resulting from application execution.

Figure 6:
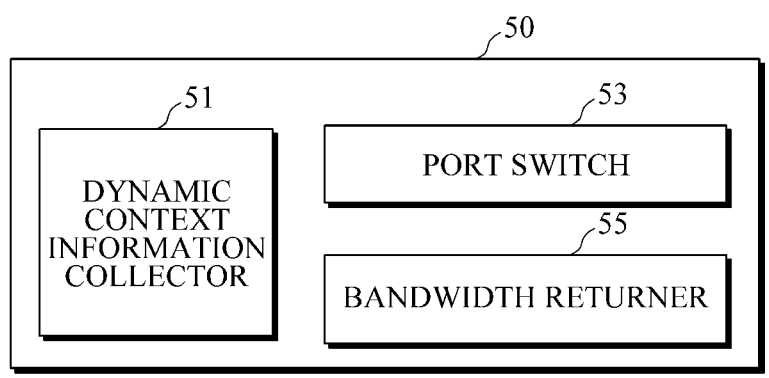
FIG. 6 is a diagram illustrating another example of a bandwidth scaler.

FIG. 6 is another diagram illustrating an example of a bandwidth scaler.

Referring to FIG. 6, the bandwidth scaler 50 includes a dynamic context information collector 51, a port switch 53, and a bandwidth returner 55 for returning bandwidth to a default bandwidth. As the dynamic context information collector 51 and the port switch 53 are the same as those described above with reference to FIG. 5, only the bandwidth returner 55 for returning bandwidth to a default bandwidth will be described in detail hereinafter.

In the event that there is no changes in the dynamic performance of the processor 10 after the scaling of the bandwidth of the external memory 30 based on collected dynamic context information, the bandwidth returner 55 for returning bandwidth to a default bandwidth may return the bandwidth of the external memory 30 to a default bandwidth. In other words, in response to a determination that the memory bandwidth is not relevant to the dynamic performance of the processor 10 as determined based on the collected dynamic context information, the bandwidth returner 55 returns the bandwidth of the external memory 30 to a default bandwidth.

For example, based on collected cache miss rates, the bandwidth may be scaled such that the bandwidth reaches a maximum level. In the event that the cache miss rates subsequently collected is still at a higher level than a threshold, it is determined that changes in dynamic performance of the processor 10 that have been determined based on collected cache miss rates are not relevant to memory bandwidth. Thus, the bandwidth returner 55 may return the memory bandwidth of the external memory 30 to a default bandwidth.

In another example, based on collected instructions per cycle, the bandwidth may be scaled such that the bandwidth reaches a maximum level. In the event that the an average value of instructions per cycle subsequently calculated continually decrease, it is determined that the memory bandwidth is not relevant to the changes in the dynamic performance of the processor 10 that were determined based on collected instructions per cycle. Thus, the bandwidth returner 55 returns the memory bandwidth of the external memory 30 to a default bandwidth.

The bandwidth returner 55 may return the memory bandwidth to a default bandwidth by using the port switch 53.

As described above, by scaling the bandwidth of an external memory at input and output terminals in consideration of dynamic context, it is possible to dynamically adjust memory bandwidth according to memory bandwidth requirements based on application workloads.

Further, it is possible to reduce leakage energy consumed by an external memory with a high bandwidth, thereby reducing power consumption in executing applications.

Figure 7:
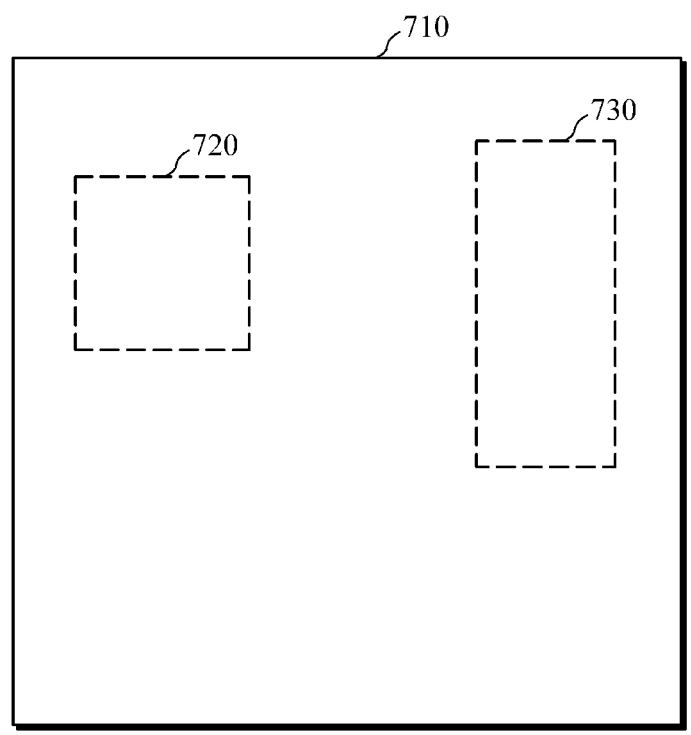
FIG. 7 is a diagram illustrating an example of an apparatus that includes a bandwidth scaler.

FIG. 7 is a diagram illustrating an example of an apparatus that includes a bandwidth scaler. The apparatus may be a portion of a computing apparatus. In this example, the apparatus includes a system on chip 710 that includes a processor 720 and an external memory 730. The external memory 730 and the processor 720 may exchange data via input and output terminals. The computation for adjusting the bandwidth may include collecting dynamic context information regarding the processor 720 and comparing the missed cache miss rate or an average value of instructions per cycle performed by the processor 720 to a predetermined threshold value. However, the implementation of a bandwidth scaler according to the present disclosure is not limited to the example illustrated in FIG. 7. While the example illustrated in FIG. 7 includes a system on chip, in another example, a bandwidth scaler may be implemented with a system in package, a printed circuit board, or other known technology.

As described above, the increase in the number of input and output terminals and the use of a 3D stacked DRAM may improve memory bandwidth. However, the power consumption may increase with the increase in memory bandwidth. By dynamically scaling the bandwidth according to workload characteristics, it may be possible to enhance performance and reduce power consumption in data transmission.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. Data may be stored in a memory. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device. Examples of the non-transitory computer readable recording medium include read-only memory (ROM), random-access memory (RAM), CD-ROMs, magnetic tapes, floppy disks, and optical data storage devices. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for adjusting bandwidth, comprising:
    collecting information corresponding to a dynamic context of a processor;
    determining the dynamic context of the processor, based on the collected information; and
    based on the determined dynamic context, dynamically scaling bandwidth by respectively activating or deactivating at least one deactivated terminal or activated terminal among a plurality of input and output terminals for a memory separately configured with respect to the processor.

2. The method of claim 1, wherein the dynamic scaling of the bandwidth comprises, in response to a determination to expand the bandwidth according to the dynamic context, activating the at least one deactivated terminal.

3. The method of claim 1, wherein the dynamic scaling of the bandwidth comprises, in response to a determination to reduce the bandwidth according to the dynamic context, deactivating the at least one activated terminal.

4. The method of claim 1, wherein the collected information comprises a cache miss rate.

5. The method of claim 4, wherein the dynamic scaling of the bandwidth comprises comparing collected cache miss rates to a predetermined threshold, and determining to expand the bandwidth in response to the collected cache miss rates being greater than the predetermined threshold.

6. The method of claim 4, wherein the dynamic scaling of the bandwidth comprises comparing collected cache miss rates to a predetermined threshold, and determining to reduce the bandwidth in response to the collected cache miss rates being smaller than the predetermined threshold.

7. The method of claim 1, wherein the collected information comprises a number of instructions per cycle processed by the processor.

8. The method of claim 7, wherein the dynamic scaling of the bandwidth comprises comparing the collected instructions per cycle to a predetermined threshold, and determining to expand the bandwidth in response to a number of the collected instructions per cycle being smaller than the predetermined threshold.

9. The method of claim 7, wherein the dynamic scaling of the bandwidth comprises comparing the collected instructions per cycle to a predetermined threshold, and determining to reduce the bandwidth in response to a number of the collected instructions per cycle being greater than the predetermined threshold.

10. The method of claim 1, further comprising, after dynamically scaling the bandwidth, in response to the dynamic context of the processor not being responsive to the scaled bandwidth, returning the scaled bandwidth to a default bandwidth.

11. The method of claim 10, wherein the returning comprises determining the responsiveness of the dynamic context based on information corresponding to the dynamic context of the processor collected after the bandwidth is scaled.

12. The method of claim 1, further comprising, after dynamically scaling the bandwidth to reach a maximum level and determining that no improvement resulted in the dynamic context from the dynamic scaling, returning the scaled bandwidth to a default bandwidth.

13. A bandwidth scaler, comprising:
an information collector configured to collect information corresponding to a dynamic context of a processor; and
a port switch configured to determine the dynamic context of the processor, based on the collected information, and to dynamically scale bandwidth by respectively activating or deactivating at least one deactivated terminal or activated terminal among a plurality of input and output terminals for a memory separately configured with respect to the processor.

14. The scaler of claim 13, wherein, in response to a determination to expand the bandwidth according to the dynamic context, the port switch is configured to activate the at least one deactivated terminal.

15. The scaler of claim 13, wherein, in response to a determination to reduce the bandwidth according to the dynamic context, the port switch is configured to deactivate the at least one activated terminal.

16. The scaler of claim 13, wherein the collected information comprises a cache miss rate.

17. The scaler of claim 16, wherein after comparing collected cache miss rates to a predetermined threshold, the port switch determines to expand the bandwidth in response to the collected cache miss rates being greater than the predetermined threshold.

18. The scaler of claim 16, wherein after comparing collected cache miss rates to a predetermined threshold, the port switch determines to reduce the bandwidth in response to the collected cache miss rates being smaller than the predetermined threshold.

19. The scaler of claim 13, wherein the collected information comprises a number of instructions per cycle processed by the processor.

20. The scaler of claim 19, wherein, after comparing the collected instructions per cycle to a predetermined threshold, the port switch determines to expand the bandwidth in response to a number of the collected instructions per cycle being smaller than the predetermined threshold.

21. The scaler of claim 19, wherein, after comparing the collected instructions per cycle to a predetermined threshold, the port switch determines to reduce the bandwidth in response to a number of the collected instructions per cycle being greater than the predetermined threshold.

22. The scaler of claim 13, further comprising a bandwidth returner configured to, after the bandwidth is dynamically scaled, return the scaled bandwidth to a default bandwidth in response to the dynamic context of the processor not being responsive to the scaled bandwidth.

23. The scaler of claim 22, wherein the bandwidth returner is configured to determine the responsiveness of the dynamic context based on information corresponding to the dynamic context of the processor collected after the bandwidth is scaled.

24. The scaler of claim 22, wherein, after dynamically scaling the bandwidth to reach a maximum level and determining that no improvement resulted in the dynamic context from the dynamic scaling, the bandwidth returner is configured to return the scaled bandwidth to the default bandwidth.

25. A method for adjusting bandwidth, comprising:
determining a dynamic context of a processor; and
based on the dynamic context, scaling bandwidth between the processor and a memory without changing voltage or frequency.

26. The method of claim 25, wherein the scaling comprises, to expand the bandwidth based on the dynamic context, activating at least one deactivated terminal among a plurality of input and output terminals.

27. The method of claim 25, wherein the scaling comprises, to reduce the bandwidth based on the dynamic context, deactivating at least one activated terminal among a plurality of input and output terminals.

28. The method of claim 25, wherein the dynamic context is determined based on a cache miss rate.

29. The method of claim 25, wherein the dynamic context is determined based on a number of instructions per cycle processed by the processor.

30. The method of claim 25, further comprising, after scaling the bandwidth, in response to the dynamic context of the processor not being responsive to the scaled bandwidth, returning the scaled bandwidth to a default bandwidth.

31. The method of claim 30, wherein the returning comprises determining the responsiveness of the dynamic context based on the dynamic context determined after the bandwidth is scaled.

32. An apparatus, comprising:
a port switch configured to dynamically scale bandwidth between a processor and a memory by activating or deactivating at least one terminal among a plurality of input and output terminals, based on a performance of the processor,
wherein the memory is an off-chip memory with respect to the processor.

33. The apparatus of claim 32, further comprising an information collector configured to collect information determining the performance of the processor.

34. The apparatus of claim 33, wherein the information collector is configured to collect at least one of a cache miss rate or a number of instructions per cycle processed by the processor as the information determining the performance of the processor.

35. The apparatus of claim 32, further comprising a bandwidth returner configured to return the scaled bandwidth to a default bandwidth in response to a determination that the performance of the processor is not responsive to the scaling of the bandwidth by the port switch.

36. The apparatus of claim 32, further comprising the processor and the memory.

* * * * *